US008813131B2

(12) United States Patent
Han et al.

(10) Patent No.: US 8,813,131 B2
(45) Date of Patent: Aug. 19, 2014

(54) METHOD AND APPARATUS OF INTERACTIVE ADVERTISING SERVICE IN DIGITAL BROADCAST SYSTEM

(75) Inventors: Kyeong Soo Han, Daejeon-si (KR); Eun Hee Hyun, Daejeon-si (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 0 days.

(21) Appl. No.: 13/584,908

(22) Filed: Aug. 14, 2012

(65) Prior Publication Data

US 2013/0205333 A1 Aug. 8, 2013

(30) Foreign Application Priority Data

Feb. 2, 2012 (KR) ........................ 10-2012-0010653

(51) Int. Cl.
*H04N 5/445* (2011.01)

(52) U.S. Cl.
USPC .................................. 725/43; 725/42; 725/51

(58) Field of Classification Search
USPC ......................................... 725/42, 43, 51, 60
See application file for complete search history.

(56) References Cited

U.S. PATENT DOCUMENTS

| 5,594,509 | A  * | 1/1997  | Florin et al. ..................... 725/43 |
| 7,523,478 | B2 * | 4/2009  | Blackketter et al. ............ 725/52 |
| 7,653,923 | B2 * | 1/2010  | Flickinger ....................... 725/36 |
| 7,712,125 | B2 * | 5/2010  | Herigstad et al. ............. 725/141 |
| 7,849,481 | B2 * | 12/2010 | Moon et al. ..................... 725/45 |
| 8,006,265 | B2 * | 8/2011  | Redling et al. .................. 725/42 |
| 8,161,412 | B2 * | 4/2012  | Weeks et al. ................... 715/854 |
| 8,327,404 | B2 * | 12/2012 | Roberts et al. .................. 725/61 |
| 8,646,005 | B2 * | 2/2014  | Klosterman et al. ............ 725/52 |
| 2002/0104086 | A1 * | 8/2002  | Tomsen et al. .................. 725/42 |
| 2002/0122137 | A1 * | 9/2002  | Chen et al. ..................... 348/552 |
| 2002/0124255 | A1 * | 9/2002  | Reichardt et al. ............... 725/42 |
| 2003/0005445 | A1 * | 1/2003  | Schein et al. .................... 725/51 |
| 2003/0014754 | A1 * | 1/2003  | Chang ............................. 725/60 |
| 2003/0056219 | A1 * | 3/2003  | Reichardt et al. ............... 725/60 |
| 2007/0156521 | A1 * | 7/2007  | Yates .............................. 705/14 |
| 2010/0153990 | A1 * | 6/2010  | Ress et al. ....................... 725/34 |
| 2010/0175084 | A1 * | 7/2010  | Ellis et al. ....................... 725/32 |

FOREIGN PATENT DOCUMENTS

| KR | 1020080107517 A | 12/2008 |
| KR | 1020100058309 A | 6/2010 |
| KR | 1020100084052 A | 7/2010 |
| KR | 1020100136605 A | 12/2010 |
| KR | 1020110057610 A | 6/2011 |

* cited by examiner

*Primary Examiner* — Pankaj Kumar
*Assistant Examiner* — Timothy Newlin
(74) *Attorney, Agent, or Firm* — William Park & Associates Patent Ltd.

(57) ABSTRACT

A method and an apparatus of interactive advertising service are provided. The method includes: receiving first advertising contents from a broadcasting advertisement platform; displaying broadcasting according to the first advertising contents on the overall screen together with at least one second advertisement contents interactive indicator indicating that the first advertising contents are linked with second advertising contents; receiving indicated information triggering at least one second advertising contents interactive indicator from an input device; receiving the second advertising contents indicated by the at least one second advertising contents interactive indicator from the broadcasting advertisement platform; and displaying broadcasting according to the second advertisement contents. According to an exemplary embodiment of the present invention, it is possible to introduce opportunity of goods information acquisition and purchasing behaviors distributed to media other than broadcasting into a smart TV while improving concentration for advertisements in bidirectional digital broadcast.

20 Claims, 12 Drawing Sheets

(a)   410 411 412

(b)

(a)  510  (b)

(a)             (b)

610

(a)   (b)

(a)   (b)

METHOD AND APPARATUS OF INTERACTIVE ADVERTISING SERVICE IN DIGITAL BROADCAST SYSTEM

CROSS-REFERENCE TO RELATED APPLICATIONS

This application claims the benefit of priority of Korean Patent Application No. 10-2012-0010653 filed on Feb. 2, 2012, all of which are incorporated by reference in their entirety herein.

BACKGROUND OF THE INVENTION

1. Field of the invention

The present invention relates to a digital broadcast system, and more particularly, to a method and an apparatus of interactive advertising service in a digital broadcast system.

2. Related Art

Recently, an interest in bidirectional advertisements in addition to unidirectional advertisements provided from the past has been increased due to the introduction of digital broadcasting. The bidirectional advertisements have been commercialized based on internet protocol TV (IPTV) and satellite broadcasting, a technology for a smart TV in addition to a hybrid TV which is a combination of Internet and terrestrial broadcasting has been recently developed, and various types of bidirectional advertisements have been interested. The smart TV may be the IPTV type or the hybrid TV type which is a combination of the terrestrial broadcasting and the Internet connection. Meanwhile, due to the Internet connection, the TV has bidirectional characteristics capable of communicating with users rather than unidirectional characteristics like the existing terrestrial broadcasting. The smart TV can implement an advertising type using the bidirectional characteristics.

Searching the related information by inputting keywords through the Internet search window in the TV needs to be subjected to several processes. In addition, in the existing broadcasting provided through the TV, the advertisements are made in a type inserted before and after broadcast programs. In this case, broadcasting advertisements consume about 15 seconds to 30 seconds per each video, such that the number of advertisements that may be inserted before and after the broadcast programs may be limited, concentration or interest of consumers for products exposed to advertisements may not be sufficiently satisfied, and the advertisement effects may be limited.

In addition, it is difficult for small and medium-sized businesses or small businesses other than businesses having considerable profits or scales to access the broadcasting advertising service through the TV due to limited advertising opportunity and expensive manufacturing costs. Therefore, an advertising model for expanding the TV broadcasting advertisement opportunity and increasing the advertising effect is needed.

A representative example of the bidirectional advertisements may include advertisement interactive advertisement. The interactive advertisement is referred to as commercial message in commercial message (CM in CM).

For example, the CM in CM may be provided in a type moving to dedicated advertiser location (DAL) when selecting additional advertisements displayed on a screen. The dedicated advertiser location is expensive and thus, it is difficult for the advertisers other than big advertisers to advertise their own advertisements. Therefore, there is no event or detailed information regarding products of primary advertisements into which advertisements are inserted.

When selecting advertisements inserted into advertisements, a need exists for an apparatus and a method of providing services that can derive and sell new advertising opportunity by connecting the primary advertisements and secondary advertisements, unlike the advertisement interactive advertisement in the DAL type connected to an advertiser dedicated page.

SUMMARY OF THE INVENTION

The present invention provides a method and an apparatus of service by inserting advertisement into advertisement in bidirectional digital broadcast. The present invention also provides environment capable of introducing opportunity of goods information acquisition and purchasing behaviors distributed to media other than broadcasting into a smart TV while improving concentration for advertisements in bidirectional digital broadcast.

The present invention expands fields and types to which commercial message in commercial message service may be applied.

In an aspect, there is provided a method of interactive advertising service in user equipment, including: receiving first advertising contents from a broadcasting advertisement platform; displaying broadcasting according to the first advertising contents on the overall screen together with at least one second advertisement contents interactive indicator indicating that the first advertising contents are linked with second advertising contents; receiving indicated information triggering at least one second advertising contents interactive indicator from an input device; receiving the second advertising contents indicated by the at least one second advertising contents interactive indicator from the broadcasting advertisement platform; and displaying broadcasting according to the second advertisement contents.

The broadcasting according to the second advertising contents may be displayed on the overall screen.

The broadcasting according to the second advertising contents may be displayed on the overall screen, together with the broadcasting according to the first advertising contents.

The broadcasting according to the second advertising contents may be displayed together with a second advertising contents ending indicator indicating that the reception of the second advertising contents ends and when the indicated information triggering the second advertisement contents ending indicator is received to from the input device, the broadcasting according to the second advertising contents may end.

The first advertising contents may be corporate public relation advertising contents and the second advertising contents may be moving picture advertising contents of a group of products produced by the corporate.

The first advertising contents may be corporate public relation advertising contents and the second advertising contents may be a moving picture brochure provided by the corporate.

The second advertising contents may be multi-spot advertising contents that are another type of advertisements about products related to the first advertising contents.

The first advertising contents may be teaser advertising contents from which direct description about products is omitted and the second advertising contents may be subsequent advertising contents including detailed description information about the products.

The first advertising contents may be brand advertising contents of a corporate and the second advertising contents may be pamphlet advertising contents of franchise shops of the corporate.

The first advertising contents may be brand advertising contents of a corporate and the second advertising contents may be advertising contents relating to positional information of franchise shops of the corporate.

The second advertising contents may be web pages providing detailed information about the first advertising contents.

The web pages may be social network service related web pages.

The social network service may be facebook application or twitter application.

The second advertising contents may be at least one of moving picture advertising contents, image advertising contents, emoticon contents, icon contents, or text advertising contents.

The input device may be a remote controller.

The input device may be a smart phone.

In another aspect, there is provided a user equipment of interactive advertising service, including a processor operated to: receive first advertising contents from a broadcasting advertisement platform; display broadcasting according to the first advertising contents on the overall screen together with at least one second advertisement contents interactive indicator indicating that the first advertising contents are linked with second advertising contents; receive indicated information triggering at least one second advertising contents interactive indicator from an input device; receive the second advertising contents indicated by the at least one second advertising contents interactive indicator from the broadcasting advertisement platform; and display broadcasting according to the second advertisement contents.

DESCRIPTION OF EXEMPLARY EMBODIMENTS

Figure 1:
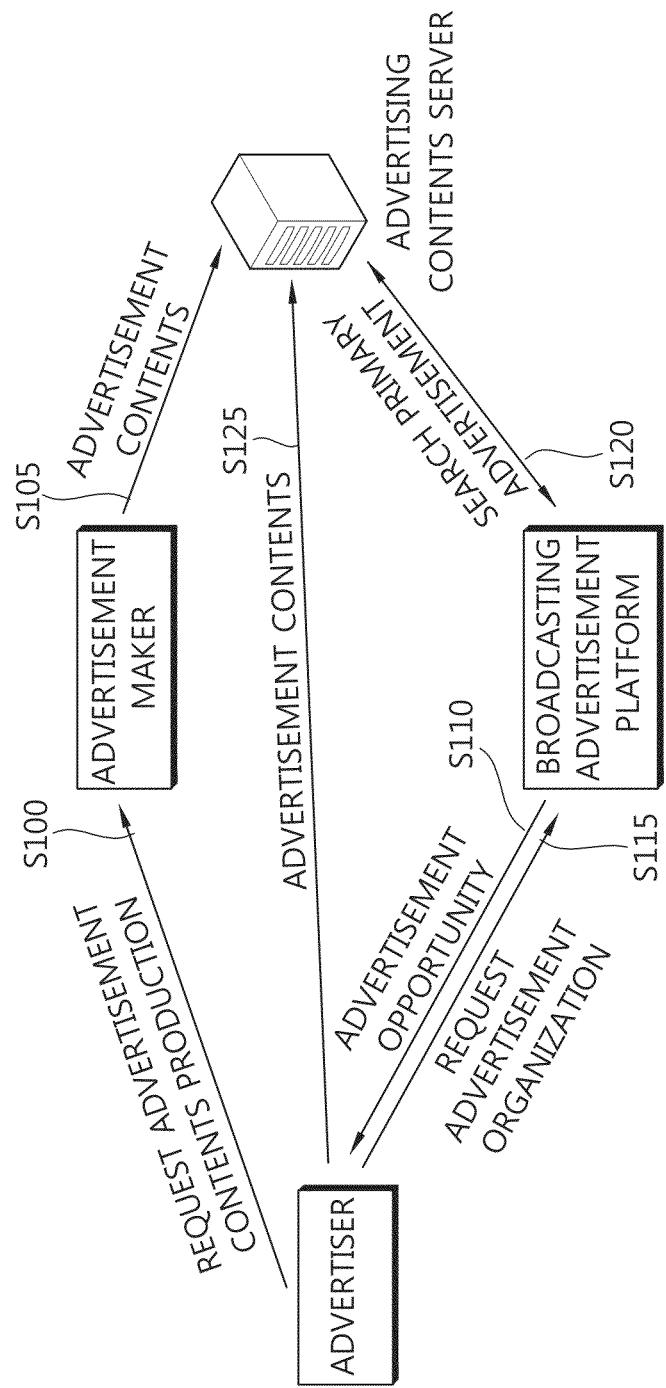
FIG. 1 is a flow chart showing an example of a process of producing and organizing advertising contents according to an exemplary embodiment of the present invention.

Hereinafter, exemplary embodiments of the present invention will be described in detail with reference to the accompanying drawings so that those skilled in the art may easily practice the present invention. However, the present invention may be implemented in various ways and is not limited to the exemplary embodiments described herein. Further, throughout the drawings, the same or similar reference numerals will be used to designate the same components or like components having the same functions in the scope of the similar idea.

A commercial message in commercial message service means an advertise service in a type in which additional advertisement opportunity is inserted into contents for advertisements. The commercial message in commercial message service allows advertisers to have an opportunity of exposing detailed information regarding additional advertisements and products to users that are interested in products. The users that are interested in products may enter secondary advertisements when wanting additional information.

The primary advertisements may be advertisements broadcast through TV In particular, the primary advertisements, such as campaign advertisement, image advertisement of businesses, series advertisement and teaser advertisement for storytelling or multisport advertisement, and the like, use various types of subsequent advertisements, thereby making it possible to maximize advertisement effects.

Secondary advertisements means advertisements linked the primary advertisements. The secondary advertisements may be advertisements for each product for a group of products produced by the same provider as the primary advertisements.

Alternatively, like the advertisements for individual goods of other providers related to a theme of campaigns of the primary advertisements, the secondary advertisements include the advertisements for individual products that target the motivation of a direct sale.

Similarly, third-order advertisements are advertisements linked with the secondary advertisements. As such, advertisements linked plural times (N-1 times) are referred to as N-order advertisements. Hereinafter, a description of the secondary advertisements may be similarly applied to the later linked third-order advertisements, fourth-order advertisements, fifth-order advertisements, N-order advertisements. Therefore, the description of the secondary advertisements does not limit the scope of the present invention and therefore, may be similarly applied even to the N−1-order advertisements (herein, N is a natural number larger than 2).

The third-order advertisements linked with the secondary advertisements are to mainly expand from TV advertising contents to an advertisement domain through media other than TV. For example, the third-order advertisements are linked with a social network to serve to confirm reliability of goods to be advertised through product use reports, comments, and the like, of general users. As another example, the third-order advertisements may be linked with sites that provide the detailed information regarding goods to be advertised. Alternatively, the third-order advertisements may be linked with pages capable of purchasing goods to be advertised or applications (T-commerce) capable of purchasing goods. In addition, the third-order advertisements include various links that may create an added value by linking web pages.

The secondary advertisements (or N-order advertisements) may not necessarily be a moving picture contents type, may be an image type such as newspaper, magazines, leaflets, and may be a simple text type.

The secondary advertisements (or information indicating the linking of the secondary advertisements) may be inserted by dividing a screen providing the existing primary advertisement video. That is, the primary advertisements and the secondary advertisements may be simultaneously provided on a screen.

FIG. 1 is a flow chart showing an example of a process of producing and organizing advertising contents.

Referring to FIG. 1, advertisers request a production of primary advertising contents to an advertisement maker (S100). The advertisers may be big advertisers like conglomerates.

The advertisement maker registers the produced primary advertising contents in an advertising contents server (S105). The advertising contents server may include a social commerce server or a social network service server.

When a broadcasting advertisement platform recommends an advertising opportunity to advertisers (S110), the advertisers request the primary advertisement organization to the broadcasting advertisement platform (S115). The broadcasting advertisement platform may organize advertisements, search advertisements, analyze advertising contents, manage consumer profiles, transmit advertisements, recommend the advertising opportunity, derive the advertisement opportunity, and analyze advertisement effects.

The broadcasting advertisement platform searches the primary advertisements from the advertising contents server to analyze the contents of the advertising contents of the primary advertisement (S120).

Even the secondary advertisement may be produced and organized similar to the above-mentioned processes. The broadcasting advertisement platform derives a secondary advertising opportunity and recommends a secondary advertising opportunity to advertisers (S110). The advertisers request the secondary advertisement organization to the broadcasting advertisement platform (S115). The advertisers request the production of the advertisements to the advertisement maker (S100) and register the already produced advertising contents in the advertising contents server (S125).

The broadcasting advertisement platform searches the secondary advertisements from the advertising contents server to analyze the secondary advertising contents (S120), organizes the secondary advertisements so as to be linked with the primary advertisements based on the primary advertising contents and the secondary advertising contents, and then, transmits the primary advertising contents to user equipment. The user equipment may be various multimedia devices such as a smart TV, a smart phone, and the like.

Figure 2:
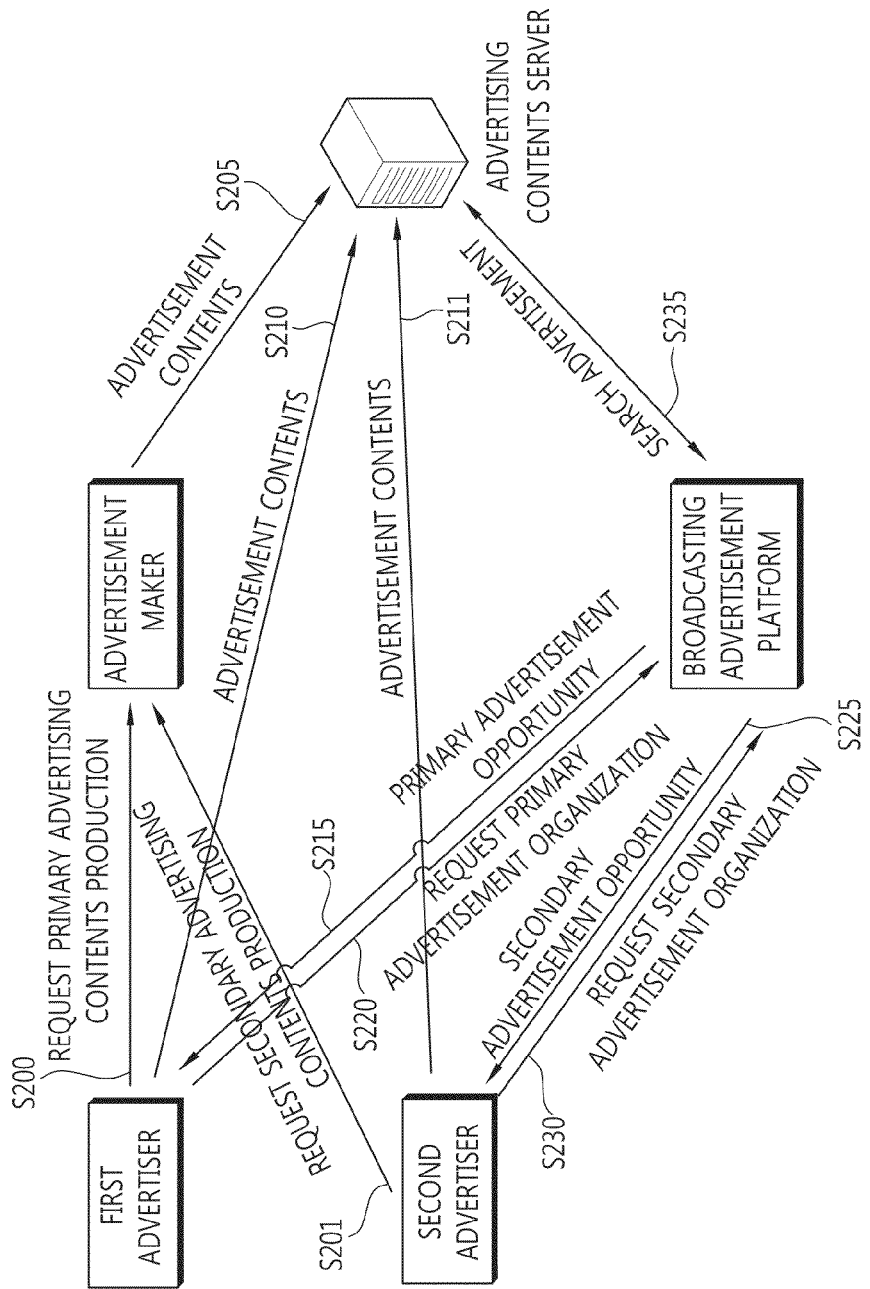
FIG. 2 is flow charts showing another example of a process of producing and organizing advertising contents according to an exemplary embodiment of the present invention.

FIG. 2 is flow charts showing another example of a process of producing and organizing advertising contents according to an exemplary embodiment of the present invention. The advertisers of the primary advertisements are not the same as the advertisers of the secondary advertisements.

Referring to FIG. 2, first advertisers request the production of the primary advertising contents to the advertisement maker (S200). For example, the first advertisers may be big advertisers like conglomerates. Second advertisers request a production of secondary advertising contents to the advertisement maker (S201). For example, the second advertisers may be local small businesses.

The advertisement maker registers the produced primary advertising contents or secondary advertising contents in the advertising contents server (S205). Alternatively, the first advertisers may directly register the previously produced advertising contents in the advertising contents server (S210) or the second advertisers may directly register the previously produced advertising contents in the advertising contents server (S211).

When the broadcasting advertisement platform recommends the advertisement opportunity to the first advertisers (S215), the first advertisers request the primary advertisement organization to the broadcasting advertisement platform (S220). Further, when the broadcasting advertisement platform recommends the advertisement opportunity to the second advertiser (S225), the second advertisers request the secondary advertisement organization to the broadcasting advertisement platform (S230).

The broadcasting advertisement platform receiving the request of the organization of the primary advertisements or the secondary advertisements searches the primary advertisements or the secondary advertisements from the advertising contents server (S235) and analyzes each advertisement content. Further, the primary advertisements are provided to the user equipment and the linked secondary advertisements are also provided according to the request of the user equipment, based on the analyzed results.

According to the exemplary embodiment of the present invention, as the commercial message in commercial message service linking the secondary advertisements with the primary advertisement videos, there are a type in which the secondary advertisements in a moving picture type are linked with each other, a type in which the secondary advertisements in an image type are linked with each other, and a type in which the secondary advertisements in a web page type are linked with each other.

First, there is the commercial message in commercial message service connected with moving pictures, which inserts the secondary advertisement moving picture related information into the primary advertisement moving pictures (Embodiment 1).

Figure 3:
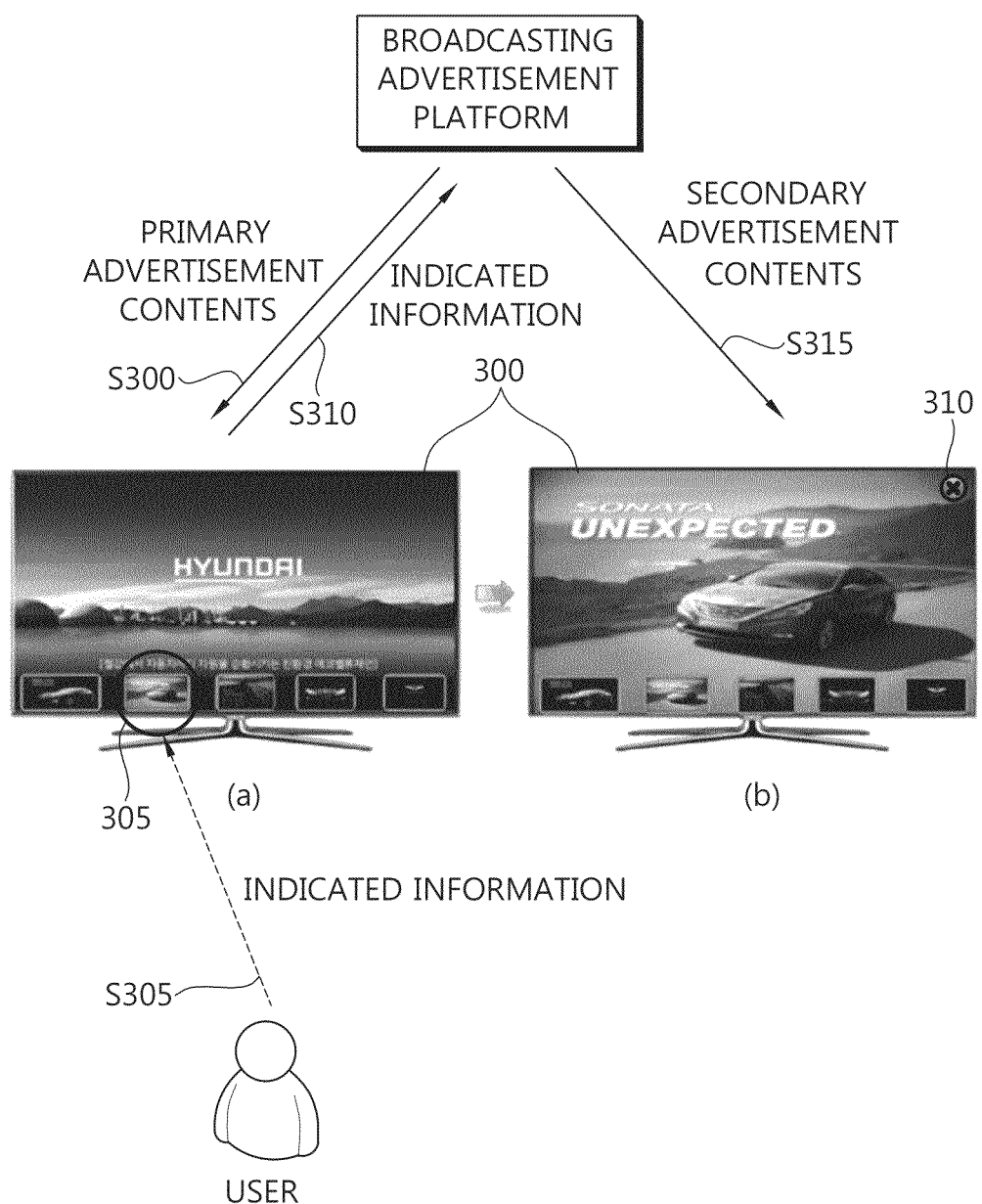
FIG. 3 is diagrams showing an example of a method of commercial message in commercial message service connected with moving pictures according to an exemplary embodiment of the present invention.

FIG. 3 is diagram showing an example of a method of commercial message in commercial message service connected with moving pictures according to an exemplary embodiment of the present invention. When the primary advertisement is a business public relations (PR) advertisement, it is linked with the moving picture advertisements for a group of products as the secondary advertisements.

Referring to FIG. 3, the broadcasting advertisement platform transmits the primary advertisement videos connected with the secondary advertisements through a base station to user equipment 300 (S300). In addition, the secondary advertisement related videos are provided while being inserted into the primary advertisement videos.

In FIG. 3A, when corporate PR advertisements (primary advertisement) of Hyundai Motor Company from the user equipment to the user is provided, the PR advertisement is provided while five car videos (or images) being inserted into a lower end thereof. For example, the user equipment may be a smart TV, a smart phone, and the like. In addition, the advertisement videos may be provided from the terrestrial broadcasting system.

The user equipment receives the information indicating the linking of the secondary advertisements from the user (S305). In FIG. 2, information 305 indicating a second car video that is interested by the user among the five car videos (or images) inserted into the lower end of the primary advertisement video screen may be received by a remote controller (hereinafter, referred to as remocon). The indicated information may be received through the remote controller from the user or may be received through a method of touching a screen of the smart TV or the smart phone.

The user equipment transmits the indicated information to the broadcasting advertisement platform (S310).

The broadcasting advertisement platform searches the secondary advertising contents fro the advertising contents server based on the indicated information and transmits the secondary advertisement videos to the user equipment (S315). In FIG. 3 (b), the moving picture advertisement videos of the second car selected by the user are provided through the user equipment. In this case, the primary advertisement videos are broadcast in real time in the background while the moving picture advertisement videos of the second car are provided.

In addition, the user equipment may transmit the information indicating the stop of the reception of the secondary advertisements to the broadcasting advertisement platform according to the user input (for example, click an icon 310 indicating the stop of the reception of the advertisements stop) and the broadcasting advertisement platform stops the transmission of the secondary advertisement based on the indicated information. In this case, the broadcasting advertisement platform may again provide the primary advertisement videos.

In addition, the user equipment may transmit the indicated information including third-order advertisement linking information (or another secondary advertisement linking information) included in the secondary advertisement videos to the broadcasting advertisement platform according to the user input and the broadcasting advertisement platform may search the third-order advertising contents based on the indicated information and transmit the third-order advertisement videos to the user equipment. Similarly, fourth-order, fifth-order, . . . , N-order advertisement videos can be transmitted.

The PR advertisement for enhancing a corporate image and the exposure of the group of products to the users can be achieved by connecting the corporate PR advertisement of Hyundai motor company with the advertisements for the car models by using the commercial message in commercial message service. In addition, the opportunity of the advertisement exposure for the individual models is increased by providing the secondary advertisements for products drawing user's attraction. In addition, it is possible to link between the moving picture advertisements for the advertisers having several groups of products, it is possible to link between the advertisements for a group of corporate PR advertisement products, and it is possible to selectively watch the advertisements for products according to the user's propensity to consume.

As another example, it is possible to set the corporate PR advertisement of big consumer electronics as the primary advertisements and set the advertisements of the group of products, such as a refrigerator, an air conditioner, TV, a washing machine, and the like, as the secondary advertisements. Alternatively, when the primary advertisements are an advertisement relating to a refrigerator, the primary advertisements may be linked with advertisements for TV, a washing machine, an air conditioner that are a group of other products as the secondary advertisements.

Figure 4:
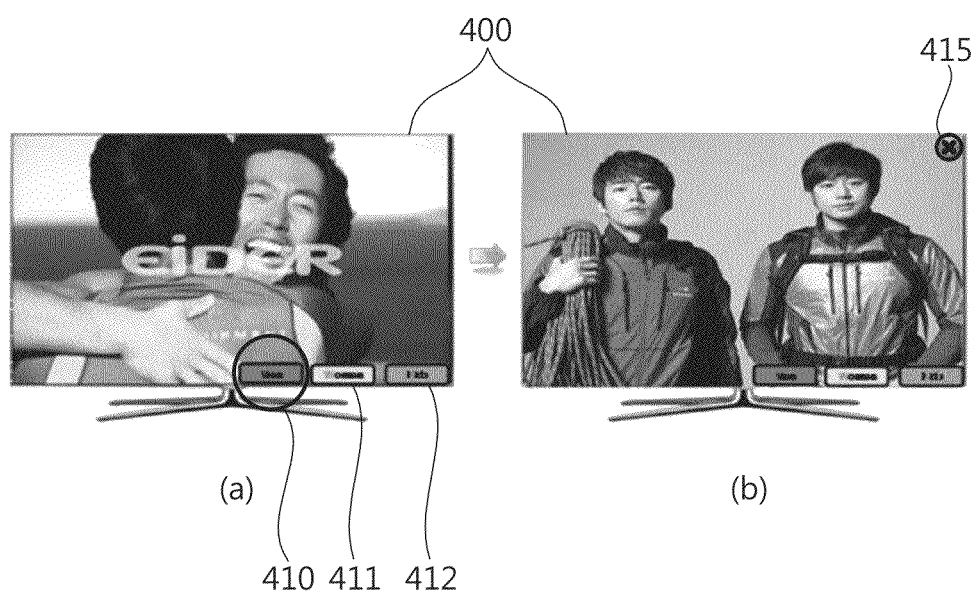
FIG. 4 is diagrams showing another example of a method of commercial message in commercial message service connected with moving pictures according to an exemplary embodiment of the present invention.

FIG. 4 is a diagram showing another example of a method of commercial message in commercial message service connected with moving pictures according to an exemplary embodiment of the present invention. When the primary advertisement is the corporate PR advertisement, the primary advertisements are linked with a moving picture brochure as the secondary advertisements.

Referring to FIG. 4 (a) and (b), when the broadcasting advertisement platform provides the primary advertisements to the user equipment 400 through the base station, the secondary advertisement related videos are provided while being inserted into the primary advertisements. The secondary advertisement related videos may be at least one icon. Alternatively, the secondary advertisement related videos may be an image type, an emoticon, or a moving picture type.

In FIG. 4 (a), when a clothes advertisement of a brand specializing in mountain clothes called "EIDER" is provided from the user equipment as the primary advertisements, three icons 410, 411, and 412, that is, "men", "women", and "kids" are provided while being inserted into the primary advertisements.

When the user selects the "men" icon 410 and inputs the selected "men" icon to the user equipment, the user equipment transmits the information indicated by icons selected by the user to the broadcasting advertisement platform. The broadcasting advertisement platform searches the secondary advertising contents related to the "men" icon based on the indicated information and transmits the secondary advertisement videos to the user equipment. In FIG. 4 (b), a moving picture brochure for male mountain clothes is provided to the user equipment.

In this case, the primary advertisement videos are broadcast in real time in the background while the moving picture advertisement videos of the second car are provided. The user equipment may transmit the information indicating the stop of the reception of the secondary advertisements to the broadcasting advertisement platform according to the user input (for example, an icon 415 indicating the stop of the reception of the advertisements) and the broadcasting advertisement platform stops the transmission of the secondary advertisements based on the indicated information. In this case, the broadcasting advertisement platform may again provide the primary advertisement videos.

Since the mountain clothes have several groups of products such as male, female, children, or the like, the advertisement effects can be increased by showing what kinds of design clothes for the products are present to the users in a moving picture brochure.

Figure 5:
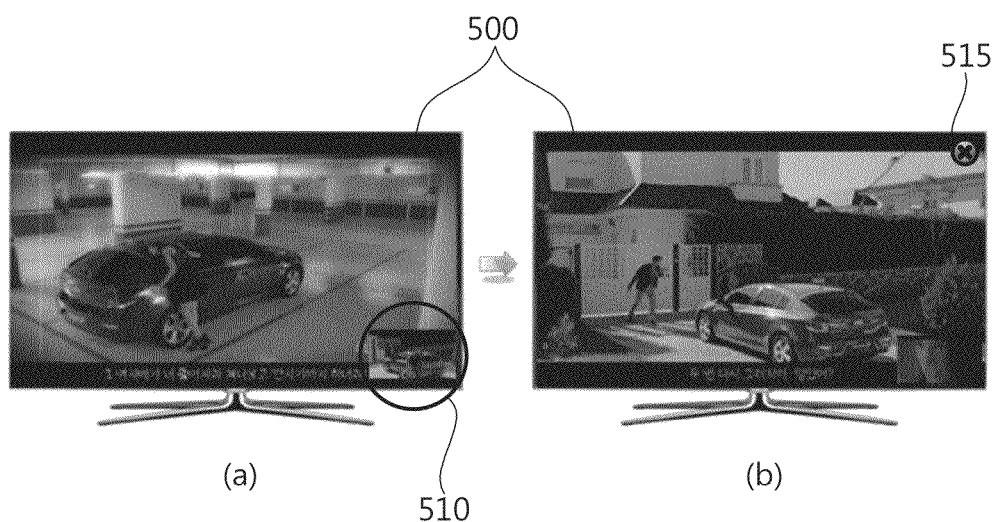
FIG. 5 is diagrams showing another example of a method of commercial message in commercial message service connected with moving pictures according to an exemplary embodiment of the present invention.

FIG. 5 is a diagram showing another example of a method of commercial message in commercial message service connected with moving pictures according to an exemplary embodiment of the present invention. The multi-spot advertisements are linked as the secondary advertisements The multi-spot advertisements, which are advertisements broadcasting various materials of advertisements for the same goods, are advertisements broadcasting several videos in a type in which they have several versions of stories under a big issue or have a similar outline but different models. The multi-spot advertisements subdivide and target the buying public or reduce the user's tediousness due to the watching of the same advertisements every day and thus, can increase the advertisement concentration.

Referring to FIG. 5, when the broadcasting advertisement platform provides the primary advertisements to user equipment 500 through the base station, the secondary advertisement related videos are provided while being inserted into the primary advertisements. The secondary advertisement related videos may be at least one moving picture. Alternatively, the secondary advertisement related videos may be a captured image type, an emoticon, icon, or a text type.

In FIG. 5 (*a*), an advertisement (primary advertisement) of Chevrolet car is provided and a women model looks around the car. A secondary advertisement related video 510 is provided while being inserted into a lower right of the advertisement.

When the user selects the secondary advertisement related video 510 and inputs the second secondary advertisement related video 510 to the user equipment 500, the user equipment transmits information indicating the provision of the secondary advertisements to the broadcasting advertisement platform. The broadcasting advertisement platform searches the secondary advertising contents based on the indicated information and transmits the secondary advertisement videos to the user equipment.

In FIG. 5 (*b*), the multi-spot advertisements of the Chevrolet car are provided as the secondary advertisement videos from the user equipment and a man model accesses the car. The user can watch advertisements without tediousness by exposing various versions of multi-spot advertisements to the users by linking the primary advertisements with the secondary advertisements.

In this case, the primary advertisement videos are broadcast in real time in the background while the secondary advertisement videos are provided. The user equipment may transmit the information indicating the stop of the reception of the secondary advertisements to the broadcasting advertisement platform according to the user input (for example, click an icon 515 indicating the stop of the reception of the advertisements) and the broadcasting advertisement platform stops the transmission of the secondary advertisement based on the indicated information. In this case, the broadcasting advertisement platform may again provide the primary advertisement videos.

Figure 6:
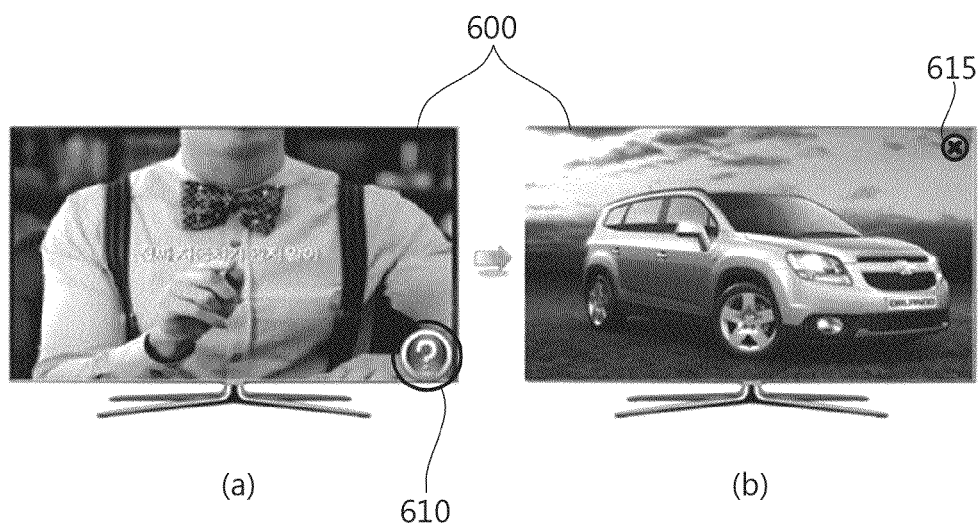
FIG. 6 is diagrams showing another example of a method of commercial message in commercial message service connected with moving pictures according to an exemplary embodiment of the present invention.

FIG. 6 is a diagram showing another example of a method of commercial message in commercial message service connected with moving pictures according to an exemplary embodiment of the present invention. When the primary advertisements are a teaser advertisement, the primary advertisements are linked with subsequent advertisements as the secondary advertisements. The teaser advertisement, which is an advertisement of a content providing curiosity to the user without directly mentioning goods, increases an interest in messages and serves to perform the introduction of the subsequent advertisements.

Referring to FIGS. 6 (*a*) (*b*), when the broadcasting advertisement platform provides the teaser advertisement, that is, the primary advertisements to user equipment 600 through the base station, the related videos as the secondary advertisement are provided while being inserted into the primary advertisements. The secondary advertisement related videos may be at least one icon. Alternatively, the secondary advertisement related videos may be an image type, an emoticon, or a moving picture type.

In FIG. 6 (*a*), the teaser advertisement of a sports utility vehicle (SUV) that is a new product of Chevrolet car company is provided as the primary advertisements. The information regarding a car is not actually published and the advertisements of the content, "you know what a real car is?" that arouses curiosity is provided. "An emoticon 610 in a question mark shape" or being linked as the secondary advertisements is provided while being inserted into the lower right thereof.

When the user selects the emoticon 610 and inputs the selected emoticon to the user equipment 600, the user equipment transmits the information indicated by the emoticon selected by the user to the broadcasting advertisement platform. The broadcasting advertisement platform searches the secondary advertising contents based on the indicated information and transmits the secondary advertisement videos to the user equipment.

In this case, the primary advertisement videos are broadcast in real time in the background while the secondary advertisement videos are provided. The user equipment may transmit the information indicating the stop of the reception of the secondary advertisements to the broadcasting advertisement platform according to the user input (for example, click an icon 615 indicating the stop of the reception of the advertisements) and the broadcasting advertisement platform stops the transmission of the secondary advertisement based on the indicated information. In this case, the broadcasting advertisement platform may again provide the primary advertisement videos.

As another example of the commercial message in commercial message service connected with the moving picture according to the exemplary embodiment of the present invention, advertisements of products that have complementary goods relationship may be linked. Herein, the complementary goods mean goods having the relationship that consumption is increased as the increase of the consumption of any one goods In the case of the products having the complementary goods relationship, even though the advertisers are different, they can help selling therebetween and thus, may be inserted as the secondary advertisements. For example, when the primary advertisements are a beer advertisement, a chicken advertisement having the complementary goods relationship as the secondary advertisement may be linked.

Second, there is a commercial message in commercial message service connected with an image in which the images are inserted into the primary advertisement moving picture as the secondary advertisements (Embodiment 2).

In this case, the images inserted as the secondary advertisements may be an image in a leaflet type distributed to an area and may be a shop guide map. It is advantageous when the small businesses that are not enough to afford the production of the broadcasting moving picture advertisements insert the simple images as the secondary advertisements. The secondary advertisements in the image type can be broadcast to the targeted consumers of the local small businesses at relatively low costs and thus, the advertisement market can be expanded.

Figure 7:
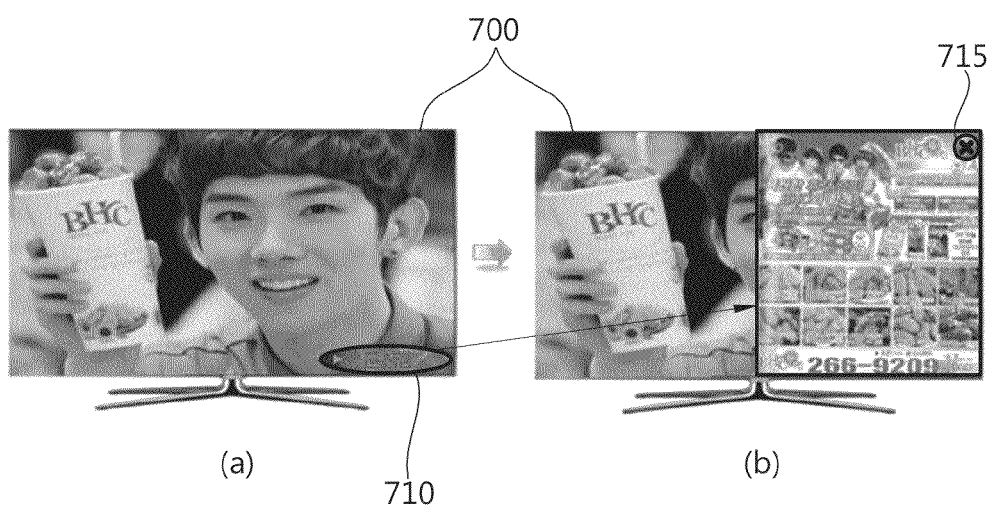
FIG. 7 is diagrams showing an example of a method of commercial message in commercial message service connected with images according to an exemplary embodiment of the present invention.

FIG. 7 is a diagram showing another example of a method of commercial message in commercial message service connected with images according to an exemplary embodiment of the present invention. When the primary advertisements are a moving picture advertisement, it is the commercial message in commercial message service connected with the image advertisements as the secondary advertisements. The leaflet image advertisements of local affiliates are linked with the moving picture advertisements of big franchises.

Referring to FIG. 7, when the broadcasting advertisement platform provides the primary advertisements to user equipment 700 through the base station, the secondary advertisement related videos are provided while being inserted into the primary advertisements. The secondary advertisement related videos may be at least one icon. Alternatively, the secondary advertisement related videos may be an image type, an emoticon, or a moving picture type.

In FIG. 7, when the advertisements of chicken brand, BHC are provided from the user equipment as the primary advertisement, the icon ("DunSan shop" 710) indicating affiliates in an area in which the user watches the advertisements is provided while being inserted thereinto.

When the user selects the "DunSan shop" icon 710 using the remote controller, or the like, and inputs the selected "DunSan shop" icon to the user equipment, the user equipment transmits the information indicated by icons to the broadcasting advertisement platform. The broadcasting advertisement platform searches the secondary advertising contents related to the "DunSan shop" icon based on the indicated information and transmits the secondary advertisement videos to the user equipment. In FIG. 7B, the leaflet image of BHC chicken "DunSan shop" is provided to the user equipment (secondary advertisement).

In this case, the leaflet images that are the secondary advertisements may be provided to the entire screen and may each be provided to the divided screen simultaneously with the primary advertisements. The user equipment may transmit the information commanding the stop of the reception of the secondary advertisements to the broadcasting advertisement platform according to the user input (for example, click an icon 715 commanding the stop of the reception of the advertisements) and the broadcasting advertisement platform stops the transmission of the secondary advertisement based on the command information. The big franchises generally perform a brand advertisement through the broadcasting advertisements, while the franchise affiliates of each area advertise their own shop by producing the leaflet and distributing the leaflet to a village. Therefore, it is possible to link the brand advertisement of the franchises with the local leaflet advertisements of small businesses by the method of commercial message in commercial message service according to the exemplary embodiment of the present invention.

In particular, it can be set to link information regarding the nearest franchise affiliates from the user equipment as the secondary advertisements based on the positional information (for example, positional information acquired using GPS) of each user equipment ("DunSan Shop" of FIG. 7).

Figure 8:
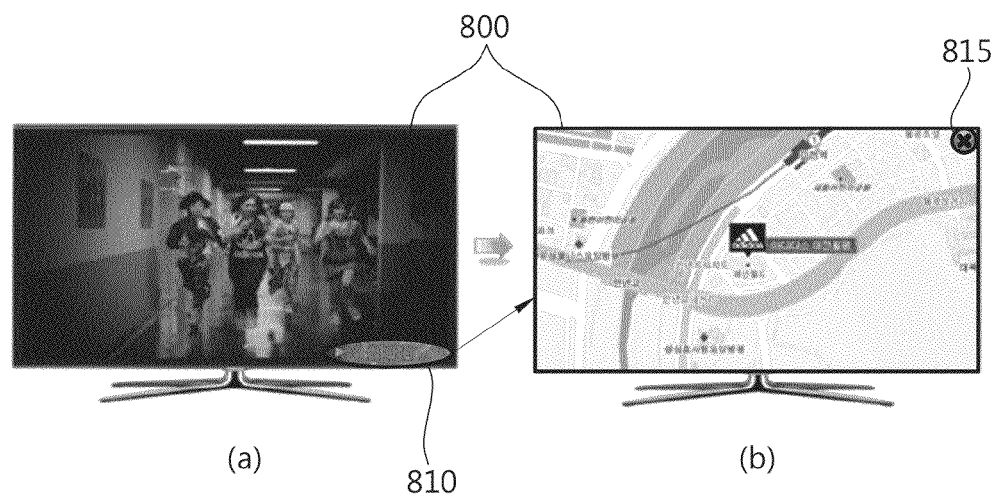
FIG. 8 is a diagram showing another example of a method of commercial message in commercial message service connected with images according to an exemplary embodiment of the present invention.

FIG. 8 is a diagram showing another example of a method of commercial message in commercial message service connected with images according to an exemplary embodiment of the present invention. When the primary advertisement is a brand moving picture advertisement, the primary advertisement is linked with the image advertisement showing a local shop map of a brand as the secondary advertisements.

Referring to FIG. 8 (*a*), when the moving picture advertisements (primary advertisement) of Adidas brand is provided to the user equipment, the secondary related advertisement related videos ("WallPyeong Shop" 810) icon are provided while being inserted into the primary advertisements.

In this case, the secondary related advertisement related videos may be set as the information indicating the local shops of the surrounding Adidas brand (for example, the nearest) based on the positional information of the user equipment.

When the user selects a "WallPyeong Shop" icon 810 using the remote controller and inputs the selected "WallPyeong Shop" icon to the user equipment, the user equipment transmits the information indicated by icons selected by the user to the broadcasting advertisement platform. The broadcasting advertisement platform searches the secondary advertising contents related to the "WallPyeong Shop" icon based on the indicated information and transmits the secondary advertisement videos to the user equipment. In FIG. 8 (*b*), the map image around the "WallPyeong Shop" of the Adidas Brand is provided. The map image that is the secondary advertisements may be provided to the entire screen of the user equipment and may be provided to the divided screen together with the primary advertisements.

In particular, it can be set to link the map image of the nearest franchise affiliates of brand from the user equipment as the secondary advertisements based on the positional information (for example, positional information acquired using GPS) of each user equipment.

The second advertisers that are a shopkeeper of the local affiliates have the broadcasting advertisement opportunity in their own business area and the first advertisers that are brand advertisers can promote the overall sales increase of brand. The reason is effective that the primary advertisers have small repulsion in inserting the secondary advertisements.

Third, there is a commercial message in commercial message service connected with a web in which Internet web pages are inserted into the primary advertisement moving picture as the secondary advertisements (Embodiment 3).

The detailed information, the goods evaluation information, and the like, regarding products that are interested by the users may be provided by linking the web pages. In addition, when the users to access SNS so as to obtain a larger amount of information such as the evaluation of other users for the advertisement goods, the secondary advertisements connected with a web may be inserted so as for the user to easily access the SNS of the advertisers.

Figure 9:
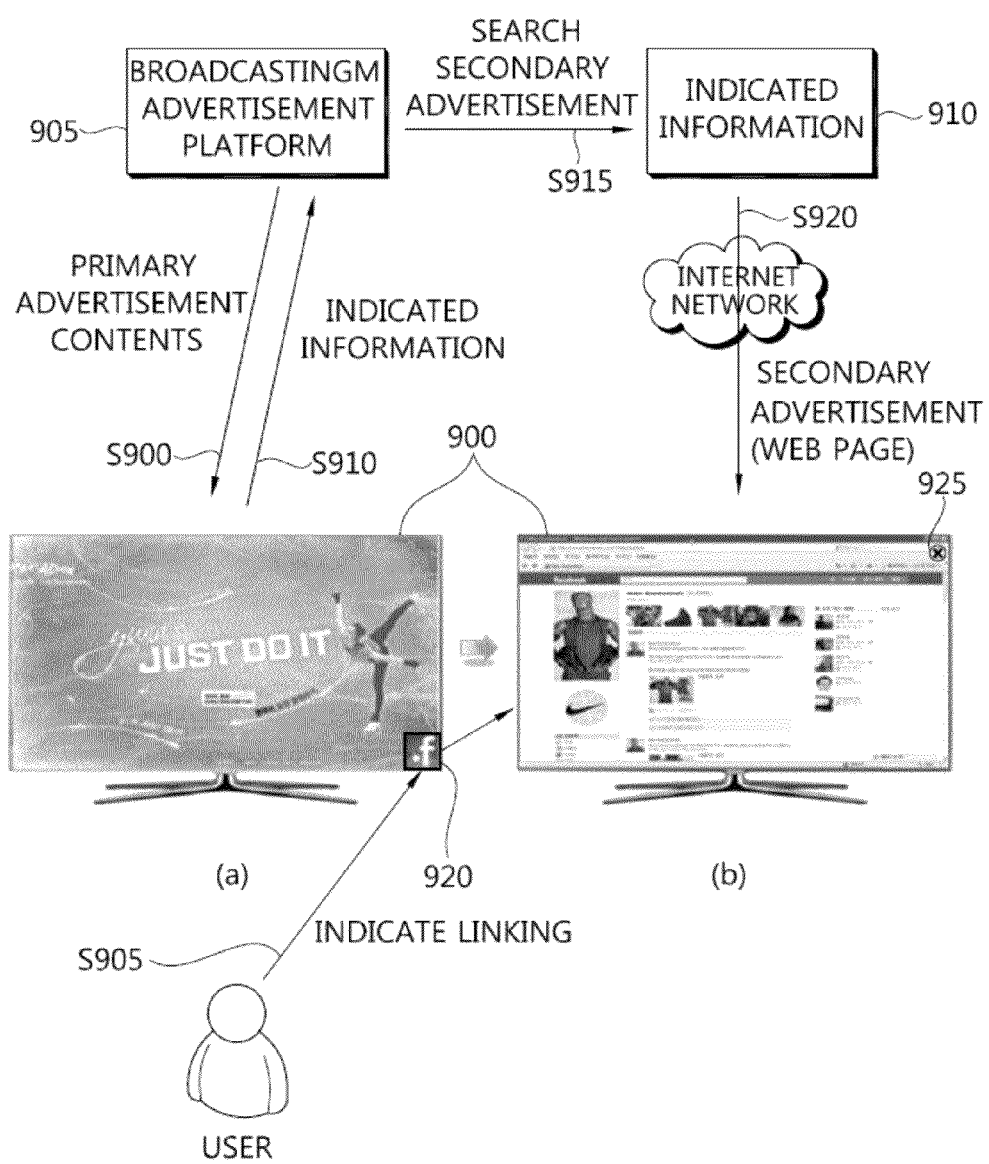
FIG. 9 is diagrams showing an example of a method of commercial message in commercial message service connected with a web according to an exemplary embodiment of the present invention.

FIG. 9 is a diagram showing an example of a method of commercial message in commercial message service connected with a web according to an exemplary embodiment of the present invention. When the primary advertisements are a brand advertisement or an advertisement about products, it is linked with the web pages about a brand or products as the secondary advertisements. The web page may provide a social network service (SNS) and may be social applications such as a facebook or twitter.

Referring to FIG. 9, when a broadcasting advertisement platform 905 transmits the primary advertising contents to user equipment 900 through the base station, the secondary advertisement related videos are provided while being inserted into the primary advertisements (S900). The secondary advertisement related videos may be at least one icon. Alternatively, the secondary advertisement related videos may be an image type, an emoticon, or a moving picture type.

In FIG. 9 (*a*), when the moving picture advertisements of Nike brand that is the primary advertisements are provided from the user equipment, a facebook icon 920 is provided while being inserted into the advertisement.

The user equipment receives the information indicating the linking of the secondary advertisements from the user (S905). In FIG. 9A, a facebook icon 920 inserted into the lower right of the primary advertisement video screen may be clicked by a remote controller or may be received by a method of touching a screen of a smart TV or a smart phone.

The user equipment transmits the indicated information to the broadcasting advertisement platform (S910).

The broadcasting advertisement platform searches the secondary advertising contents from the advertising contents server based on the indicated information (S915).

The advertising contents server transmits the web pages that are the secondary advertisements to the user equipment through the Internet network (S920). In FIG. 9B, the facebook web pages of Nike selected by the user is provided to the user equipment. In this case, the primary advertisement videos are broadcast in the Background in real time while receiving the facebook web pages.

The user equipment may transmit the information commanding the stop of the reception of the secondary advertisements to the broadcasting advertisement platform according to the user input (for example, click an icon 925 commanding the stop of the reception of the advertisements) and the broadcasting advertisement platform stops the transmission of the secondary advertisement based on the command information. In this case, the broadcasting advertisement platform may again provide the primary advertisement videos.

In the related art, the information can be obtained through the web sites, the SNS, and the like, of the corresponding products using PCs. In addition, in the case of the social commerce goods, the user can confirm and purchase what the goods corresponding to his/her own area through the Internet.

However, according to the commercial message in commercial message service connected with a web of the exemplary embodiment of the present invention, the user can easily be linked with the web page advertisement through the smart TV without performing the search using a separate computer. The advertisers more easily provide the detailed information regarding their own products to the users, thereby making it possible to increase the advertisement effects.

Figure 10:
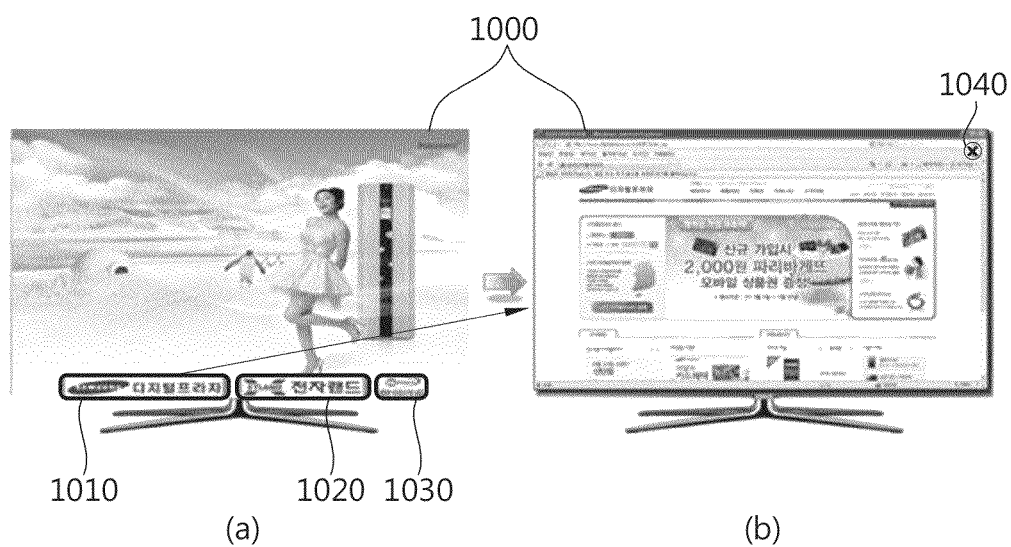
FIG. 10 is diagrams showing another example of a method of commercial message in commercial message service connected with a web according to an exemplary embodiment of the present invention.

FIG. 10 is a diagram showing another example of a method of commercial message in commercial message service connected with a web according to an exemplary embodiment of the present invention. When the primary advertisements are a brand advertisement or an advertisement about products, it is linked with the web pages (for example, Internet shopping mall) selling a brand or products as the secondary advertisements.

When purchasing products through web pages like the Internet shopping mall, it is possible to link the web pages of a shop that sells products advertised from the primary advertisements as the secondary advertisements.

Referring to FIG. 10 (a), the secondary advertisement related videos (icon, "Digital Plaza, 1010", "Electronic Land, 1020" "Himart, 1030") linking with the web pages selling the air conditioner are provided to a user equipment 1000 through a base station from the broadcasting advertisement platform while being inserted into the primary advertisement moving pictures of an air condition from SamSung Electronics.

When the user equipment receives the information indicating the linking of the secondary advertisements from the user, the broadcasting advertisement platform searches the secondary advertising contents from the advertising contents server based on the indicated information and transmits the secondary advertisement videos to the user equipment.

In FIG. 10 (a), when the user clicks a "digital plaza 1010" icon to receive the indicated information, the air conditioner related pages among the "digital plaza" web pages are linked. Alternatively, when the user clicks the "Electronic Land 1120" icon, the air conditioner related web page among the web pages of "Electronic Land" is linked as the secondary advertisements and when the user clicks the "Himart 1130" icon, the air conditioner related web pages among the "Himart" web pages are linked as the secondary advertisements.

The user equipment may transmit the information commanding the stop of the reception of the secondary advertisements to the broadcasting advertisement platform according to the user input (for example, click an icon 1040 commanding the stop of the reception of the advertisements stop) and the broadcasting advertisement platform stops the transmission of the secondary advertisement based on the command information. In this case, the broadcasting advertisement platform may again provide the primary advertisement videos.

The user may purchase the air conditioner through the web pages. The advertisers of the primary advertisements can obtain a positive effect such as the sales increase of their own products. The consumer electronics shop that is the advertisers of the secondary advertisements, or the like, induce the users that are interested in an air conditioner to their own shops.

Figure 11:
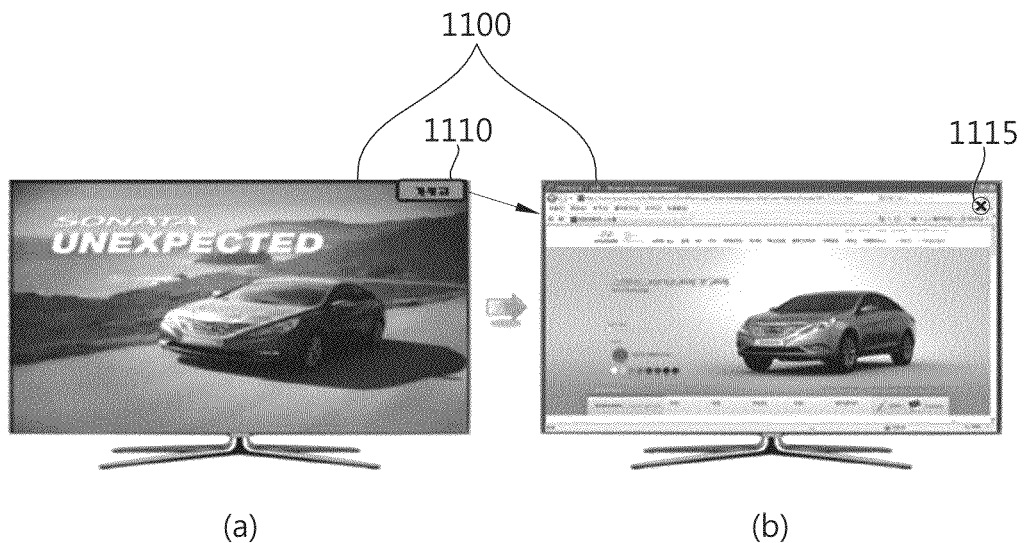
FIG. 11 is diagrams showing another example of a method of commercial message in commercial message service connected with a web according to an exemplary embodiment of the present invention.

FIG. 11 is a diagram showing another example of a method of commercial message in commercial message service connected with a web according to an exemplary embodiment of the present invention. When the primary advertisements are the product advertisement moving pictures, the primary advertisements are linked with the web pages (for example, home pages) indicating the detailed information of the products as the secondary advertisements.

Referring to FIG. 11 (a), the broadcasting advertisement platform provides the advertisement moving pictures of "Sonata" product of Hyundai motor car to a user equipment 1100 as the primary advertisements. In this case, the secondary advertisement related videos (icon 1110) are provided together. When the user has a question for detailed data of Sonata, he/she clicks the icons to link the secondary advertisements. In this case, as shown in FIG. 11 (b), it is possible to receive the "Sonata" related web pages of a home page of Hyundai motor car.

The user equipment may transmit the information commanding the stop of the reception of the secondary advertisements to the broadcasting advertisement platform according to the user input (for example, click an icon 1115 commanding the stop of the reception of the advertisements stop) and the broadcasting advertisement platform stops the transmission of the secondary advertisement based on the command information. In this case, the broadcasting advertisement platform may again provide the primary advertisement videos.

The method of commercial message in commercial message service described in FIGS. 3 to 11 is not limited to the secondary advertisements. The N-order advertising service can be made by combining types such as a moving picture link type, an image link type, a web link type.

Figure 12:
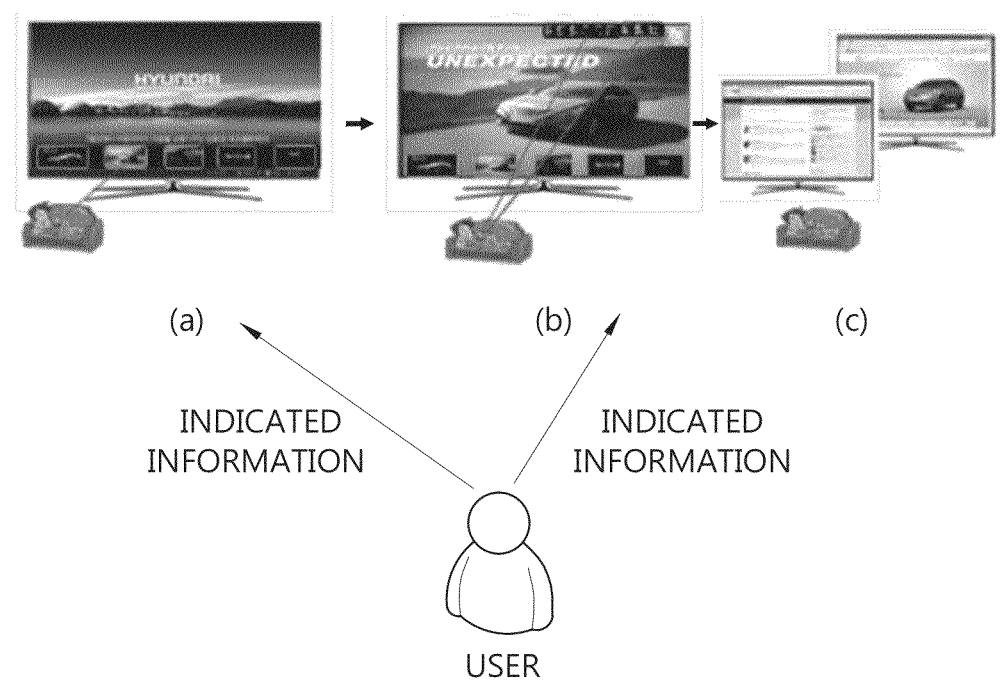
FIG. 12 is a diagram showing an example of a method of interactive commercial message in commercial message service according to an exemplary embodiment of the present invention.

FIG. 12 is a diagram showing an example of a method of interactive commercial message in commercial message service according to an exemplary embodiment of the present invention. This is a method of servicing the third-order advertisements.

Referring to FIG. 12 (a), the corporate PR advertisement of Hyundai motor company is provided from the user equipment. It is possible to being linked as the secondary advertisement according to the indicated information input of the user and as shown in FIG. 12B, it is possible to provide one advertisement moving picture among five cars produced from the Hyundai motor car. Among the provision of the secondary advertisements, it is possible to be linked as the third-order advertisements according to the indicated information input of the user and as shown in FIG. 12C, it can be linked with the web pages through which the detailed information of the car selected by the user can be seen.

According to the exemplary embodiment of the present invention, when the subsequent advertisements of the advertising contents for the commercial message in commercial message service are inserted, the participating desire of the consumers can arouse by connecting a plurality of linked advertisements and by exciting the curiosity of consumers according to the advertisement strategy. If the number of subsequent advertisements to be inserted cannot be displayed on a single screen, the user can search the advertisements while moving the screen using a scroll button. As a result, the number of advertisements exposed at a short period of time can be maximized The limited advertisement opportunity is used multi-dimensionally in terms of time and costs and thus, the advertisement opportunity can be expanded and the scale of the advertisement market may be expanded. Local small and medium-sized businesses or businesses can obtain the advertisement opportunity without large investment costs through linked advertisements and the advertiser of the primary advertisement can also reduce cost burdens by dividing the advertisement opportunity.

The advertisers have the opportunity for exposing the additional advertisements and the detailed information on the products to aggressive users that are interested in their own products and the users can directly access the corresponding web pages from the advertising contents without using a separate PC so as to obtain the information on the detailed information and the goods evaluation of products, thereby making it possible to conveniently and immediately do the purchasing behaviors.

The broadcasting service environment according to the exemplary embodiment of the present invention reorganizes the performed advertisements based on TV broadcasting through different media. As a result, it is possible to expand the area of the TV broadcasting.

According to the exemplary embodiments of the present invention, it is possible to improve the concentration for advertisements and introduce the opportunity of the goods information acquisition and purchasing behaviors distributed to media other than broadcasting into the smart TV.

According to the exemplary embodiments of the present invention, it is possible to immediately search the information regarding the corresponding goods and the information connected with the corresponding advertisements during watching the TV advertisements without inconvenience to connect the information to other media.

According to the exemplary embodiments of the present invention, it is possible to provide the relatively inexpensive advertisement opportunity to small and medium-sized businesses and small businesses while expanding the advertisement opportunity.

In the above-mentioned exemplary system, although the methods have described based on a flow chart as a series of steps or blocks, the present invention is not limited to a sequence of steps but any step may be generated in a different sequence or simultaneously from or with other steps as described above. Further, it may be appreciated by those skilled in the art that steps shown in a flow chart is non-exclusive and therefore, include other steps or deletes one or more steps of a flow chart without having an effect on the scope of the present invention.

The spirit of the present invention has been just exemplified. It will be appreciated by those skilled in the art that various modifications and alterations can be made without departing from the essential characteristics of the present invention. Accordingly, the embodiments disclosed in the present invention and the accompanying drawings are used not to limit but to describe the spirit of the present invention. The scope of the present invention is not limited only to the embodiments. The protection scope of the present invention must be analyzed by the appended claims and it should be analyzed that all spirits within a scope equivalent thereto are included in the appended claims of the present invention.

What is claimed is:

1. A method of interactive advertising service in user equipment, comprising:
   receiving first advertising contents from a broadcasting advertisement platform;
   displaying broadcasting according to the first advertising contents on the overall screen together with at least one second advertising contents interactive indicator indicating that the first advertising contents are linked with second advertising contents;
   receiving indicated information triggering at least one second advertising contents interactive indicator from an input device; transmitting the indicated information to the broadcasting advertisement platform;
   receiving the second advertising contents indicated by the at least one second advertising contents interactive indicator from the broadcasting advertisement platform, wherein the broadcasting advertisement platform searches for the second advertising contents based on the transmitted indicated information; and
   displaying broadcasting according to the second advertising contents.

2. The method of claim 1, wherein the broadcasting according to the second advertising contents is displayed on the overall screen.

3. The method of claim 1, wherein the broadcasting according to the second advertising contents is displayed on the overall screen, together with the broadcasting according to the first advertising contents.

4. The method of claim 1, wherein the broadcasting according to the second advertising contents is displayed together with a second advertising contents ending indicator indicating that the reception of the second advertising contents ends, and
   when the indicated information triggering the second advertising contents ending indicator is received from the input device, the broadcasting according to the second advertising contents ends.

5. The method of claim 1, wherein the first advertising contents are corporate public relation advertising contents, and
   the second advertising contents are video advertising contents of a group of products produced by the corporate.

6. The method of claim 1, wherein the broadcasting advertisement platform organizes the second advertising contents to link the second advertising contents with the first advertising contents based on the second advertising contents and the first advertising contents, and then transmits the first advertising contents.

7. The method of claim 1, wherein the first advertising contents is a video that is broadcast in real time in the background while a video comprising the second advertising contents is played.

8. The method of claim 1, wherein the first advertising contents are teaser advertising contents from which direct description about products is omitted, and
   the second advertising contents are subsequent advertising contents including detailed description information about the products.

9. The method of claim 1, wherein the first advertising contents are brand advertising contents of a corporate, and
   the second advertising contents are one of pamphlet advertising contents of franchise shops of the corporate or advertising contents relating to positional information of franchise shops of the corporate.

10. The method of claim 1, wherein the broadcasting advertisement platform is configured to recommend first advertising contents and second advertising contents to advertisers.

11. The method of claim 10, wherein the advertisers of the first advertising contents are different advertisers than the advertisers of the second advertising content.

12. The method of claim 11, wherein the second advertising contents is web pages providing detailed information about the first advertising contents and the web pages are social network service related web pages.

13. The method of claim 12, wherein the social network service is facebook application or twitter application.

14. The method of claim 1, wherein the second advertising contents are at least one of video advertising contents, image advertising contents, emoticon contents, icon contents, or text advertising contents.

15. The method of claim 1, wherein the broadcasting advertisement platform searches an advertising contents server for the first advertising content and the second advertising content, where first advertisers register the first advertising contents in the advertising contents server and second advertisers register the second advertising contents in the advertising contents server.

16. The method of claim 1, wherein the input device is a smart phone.

17. A user equipment of interactive advertising service, comprising a processor operated to:
receive first advertising contents from a broadcasting advertisement platform;
display broadcasting according to the first advertising contents on the overall screen together with at least one second advertising contents interactive indicator indicating that the first advertising contents are linked with second advertising contents;
receive indicated information triggering at least one second advertising contents interactive indicator from an input device; transmit the indicated information to the broadcasting advertisement platform;
receive the second advertising contents indicated by the at least one second advertising contents interactive indicator from the broadcasting advertisement platform, where the broadcast advertisement platform searches for the second advertising contents based on the transmitted indicated information; and
display broadcasting according to the second advertising contents.

18. The user equipment claim of 17, wherein the processor displays the broadcasting according to the second advertising contents on the overall screen.

19. The user equipment of claim 17, wherein the processor displays the broadcasting according to the second advertising contents on the overall screen, simultaneously together with the broadcasting according to the first advertising contents.

20. The user equipment of claim 17, wherein the broadcasting according to the advertising contents further includes a second advertising contents ending indicator, and
the processor ends the broadcasting according to the second advertising contents when the indicated information triggering the second advertising contents ending indicator is received from the input device.

* * * * *